United States Patent [19]
Hetherington et al.

[11] Patent Number: 5,349,651
[45] Date of Patent: Sep. 20, 1994

[54] SYSTEM FOR TRANSLATION OF VIRTUAL TO PHYSICAL ADDRESSES BY OPERATING MEMORY MANAGEMENT PROCESSOR FOR CALCULATING LOCATION OF PHYSICAL ADDRESS IN MEMORY CONCURRENTLY WITH CACHE COMPARING VIRTUAL ADDRESSES FOR TRANSLATION

[75] Inventors: Ricky C. Hetherington, Northboro; David A. Webb, Jr., Berlin; David B. Fite, Northboro; John E. Murray, Acton; Tryggve Fossum, Northboro; Dwight P. Manley, Holliston, all of Mass.

[73] Assignee: Digital Equipment Corporation, Maynard, Mass.

[21] Appl. No.: 746,007

[22] Filed: Aug. 9, 1991

Related U.S. Application Data

[63] Continuation of Ser. No. 306,544, Feb. 3, 1989, abandoned.

[51] Int. Cl.$^5$ .................. G06F 12/10; G06F 12/00
[52] U.S. Cl. .................. 395/400; 395/425; 364/243.41; 364/256.3; 364/256.4; 364/256.5; 364/DIG. 1; 364/961.4; 364/961.2
[58] Field of Search ............ 395/800, 425, 400, 500

[56] References Cited

U.S. PATENT DOCUMENTS

| | | | |
|---|---|---|---|
| 4,264,953 | 4/1981 | Douglas et al. | 395/400 |
| 4,525,778 | 6/1985 | Cane | 364/200 |
| 4,586,130 | 4/1986 | Butts, Jr. et al. | 364/200 |
| 4,587,610 | 5/1986 | Rodman | 395/400 |
| 4,654,777 | 3/1987 | Nakamura | 395/400 |
| 4,694,395 | 9/1987 | Young et al. | 395/425 |
| 4,727,485 | 2/1988 | Keshlear et al. | 395/400 |
| 4,727,486 | 2/1988 | Smith et al. | 395/425 |
| 4,731,740 | 3/1988 | Eguchi | 364/200 |
| 4,774,653 | 9/1988 | James | 395/400 |
| 4,785,398 | 11/1988 | Joyce et al. | 364/200 |
| 4,802,085 | 1/1989 | Levy et al. | 364/200 |
| 4,825,412 | 4/1989 | Sager et al. | 365/49 |
| 4,831,520 | 5/1989 | Rubinfeld | 364/200 |
| 4,851,991 | 7/1989 | Rubinfeld et al. | 364/200 |
| 4,933,835 | 6/1990 | Sachs et al. | 364/200 |
| 4,991,081 | 2/1991 | Bosshart | 395/425 |
| 5,029,072 | 7/1991 | Moyer et al. | 395/425 |
| 5,230,045 | 7/1993 | Sindhu | 395/425 |
| 5,239,635 | 8/1993 | Stewart et al. | 395/400 |
| 5,241,638 | 8/1993 | Mork et al. | 395/400 |

*Primary Examiner*—Thomas C. Lee
*Assistant Examiner*—Paul Harrity
*Attorney, Agent, or Firm*—Richard J. Paciulan; Denis G. Maloney

[57] ABSTRACT

In the field of high speed computers it is common for a central processing unit to reference memory locations via a virtual addressing scheme, rather than by the actual physical memory addresses. In a multi-tasking environment, this virtual addressing scheme reduces the possibility of different programs accessing the same physical memory location. Thus, to maintain computer processing speed, a high speed translation buffer cache is employed to perform the necessary virtual-to-physical conversions for memory reference instructions. The translation buffer cache stores a number of previously translated virtual addresses and their corresponding physical addresses. A memory management processor is employed to update the translation buffer cache with the most recently accessed physical memory locations. The memory management processor consists of a state machine controlling hardware specifically designed for the purpose of updating the translation buffer cache. The memory management processor calculates an address of a location in the memory where the physical address is stored concurrently with the translation buffer cache comparing the virtual address with already stored virtual addresses. With this arrangement the memory management unit can immediately access memory to retrieve the physical address upon a "miss" by the translation buffer cache.

16 Claims, 6 Drawing Sheets

SYSTEM FOR TRANSLATION OF VIRTUAL TO PHYSICAL ADDRESSES BY OPERATING MEMORY MANAGEMENT PROCESSOR FOR CALCULATING LOCATION OF PHYSICAL ADDRESS IN MEMORY CONCURRENTLY WITH CACHE COMPARING VIRTUAL ADDRESSES FOR TRANSLATION

This application is a continuation of application Ser. No. 07/306,544, filed Feb. 3, 1989, now abandoned.

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989, and issued on Sep. 8, 1992 as U.S. Pat. No. 5,146,564; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989, abandoned, continued in Ser. No. 07/833,806 filed Feb. 10, 1992, still pending; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989, abandoned, continued in Ser. No. 07/646,522 filed Jan. 28, 1991, now abandoned; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989, and issued on Jun. 23, 1992 as U.S. Pat. No. 5,125,083; D. Fite et al., DECODING MULTIPLE SPECIFIERS IN A VARIABLE LENGTH INSTRUCTION ARCHITECTURE, Ser. No. 07/307,347 filed Feb. 3, 1989, now U.S. Pat. No. 5,148,528; D. Fite et al., VIRTUAL INSTRUCTION CACHE REFILL ALGORITHM, Ser. No. 07/306,831 filed Feb. 3, 1989, and issued on May 12, 1992 as U.S. Pat. No. 5,113,515; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989, now U.S. Pat. No. 5,167,026; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989 and issued as U.S. Pat. No. 5,142,631; Murray et al., PREPROCESSING IMPLIED SPECIFIERS IN A PIPELINED PROCESSOR, Ser. No. 07/306,846 filed Feb. 3, 1989 and issued as U.S. Pat. No. 5,142,633 on Aug. 25, 1992; D. Fite et al., BRANCH PREDICTION, Ser. No. 07/306,760 filed Feb. 3, 1989 and issued as U.S. Pat. No. 5,142,634 on Aug. 25, 1992; Fossum et al., PIPELINED FLOATING POINT ADDER FOR DIGITAL COMPUTER, Ser. No. Ser. No. 07/306,343 filed Feb. 3, 1989, and issued as U.S. Pat. No. 4,994,996 on Feb. 19, 1991; Grundmann et al., SELF TIMED REGISTER FILE, Ser. No. 07/306,445 filed Feb. 3, 1989, issued as U.S. Pat. No. 5,107,462 on Apr. 21, 1992; Beaven et al., METHOD AND APPARATUS FOR DETECTING AND CORRECTING ERRORS IN A PIPELINED COMPUTER SYSTEM, Ser. No. 07/306,828 filed Feb. 3, 1989 and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989, now U.S. Pat. No. 5,155,854; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989, and issued on Nov. 19, 1991 as U.S. Pat. No. 5,067,069; Webb, Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989, and issued as U.S. Pat. No. 4,985,825 on Jan. 15, 1991; Hetherington, WRITE BACK BUFFER WITH ERROR CORRECTING CAPABILITIES, Ser. No. 07/306,703 filed Feb. 3, 1989, and issued as U.S. Pat. No. 4,995,041 on Feb. 19, 1991; Chinnaswamy et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov. 6, 1990; Polzin et al., METHOD AND APPARATUS FOR INTERFACING A SYSTEM CONTROL UNIT FOR A MULTI-PROCESSOR SYSTEM WITH IN-PUT/OUTPUT UNITS, Ser. No. 07/306,862 filed Feb. 3, 1989, and issued as U.S. Pat. No. 4,965,793 on Oct. 23, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989 and issued as U.S. Pat. No. 5,043,874 on Aug. 27, 1991; Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989, abandoned, continued in Ser. No. 07/582,493 filed Sep. 14, 1990, now abandoned; Hetherington et al., METHOD AND APPARATUS FOR INCREASING THE DATA STORAGE RATE OF A COMPUTER SYSTEM HAVING A PREDEFINED DATA PATH WIDTH, Ser. No. 07/306,826 filed Feb. 3, 1989, and issued as U.S. Pat. No. 5,019,965 on May 28, 1991; Hetherington et al., METHOD AND APPARATUS FOR ORDERING AND QUEUING MULTIPLE MEMORY REQUESTS, U.S. Ser. No. 07/306,870 filed Feb. 3, 1989, now U.S. Pat. No. 5,222,223.

TECHNICAL FIELD

This invention relates generally to an apparatus for controlling the translation of virtual memory addresses to physical memory addresses in a virtual memory processor system and more particularly to a high speed translation buffer and an associated fixup unit for maintaining a cache of recently used translations to enhance translation speed.

DESCRIPTION OF RELATED ART

Conventional digital computers process data in accordance with "fetch-execute" cycles in which instructions are fetched from memory and executed. Each cycle may include a number of intermediate steps, depending on the specific instruction. An instruction, for example, may specify operands which must be fetched from memory before the instruction is executed.

In small, low-speed computers, the fetch-execute cycle is performed for one instruction at a time. For example, the fetch of the next instruction does not occur until the result of the current instruction has been stored. The hardware devoted to each step in the fetch-execute cycle is used only during that corresponding step and then remains idle until needed for the next instruction.

Larger computers shorten their execution time by prefetching instructions, so that the next instruction is ready for decoding as soon as the result of the current instruction is stored. This is a simple form of "pipelining" in which the first step in the cycle is performed for the next instruction at the same time that the last step is performed for the current instruction. This simple form of pipelining decreases the total time for performing the instructions.

The most advanced computers pipeline the entire sequence of instruction activities. A prime example is the VAX 8600 computer manufactured and sold by Digital Equipment Corporation, 111 Powdermill Road, Maynard, Mass. 97154-1418. The instruction pipeline for the VAX 8600 is described in T. Fossum et al., "An Overview of the VAX 8600 System, " Digital Technical Journal, No 1, August 1985, pp. 8–23. Separate pipeline stages are provided for instruction fetch, instruction decode, operand address generation, operand fetch, instruction execute, and result store. The pipeline stages are usually busy processing successive instructions, but movement through the pipeline cannot always be at top speed. Various stages must sit idle whenever data must be fetched from main memory instead of a high speed cache memory that stores previously addressed data blocks, or when a multiplication or division ties up the instruction execution stage.

It should be noted that these processors typically employ virtual memory systems which are advantageous, in particular, in multi-user environments. In a virtual memory system, a program references memory locations as if they were actual physical memory locations. Other programs running concurrently also reference memory locations without regard to the memory activities of the programs running at the same time. There is an obvious possibility of memory conflicts if each of the programs are indeed accessing physical memory. Separate programs may attempt to read and write the same physical memory locations resulting in a loss of data integrity. For example, data stored at a memory location by one program may be overwritten by a second program. Thus, when the first program retrieves the data stored at that location it receives the wrong data.

Therefore, prior computer systems have employed a virtual memory system which allows each program to be written to operate as if it were the only program running with access to the entirety of process memory. To facilitate this virtual memory system, the responsibility for keeping track of how the virtual memory corresponds to physical memory is relegated to the memory access unit. A look-up table of virtual-to-physical memory location conversions is maintained in processor memory. As the program makes virtual memory references, they are translated into physical memory locations by accessing the look-up table.

This process works well, but the purpose of pipelining is to increase processor speed. Clearly, the time consumed by the conversion of each memory reference is a burden to ultimate processor speed. Accordingly, prior systems have increased the speed of these conversions by maintaining a cache of the most recently used conversions. A translation buffer maintains a small segment of the set of virtual-to-physical memory conversions. Thus, each memory reference is compared to the set of recently used conversions by the translation buffers and a "hit" results in the conversion process being completed. This has a dramatic effect on processor speed since memory need not be accessed to perform the conversion.

However, since the translation buffer contains only a small portion of the set of virtual to physical memory conversions, "misses" occur In the event of a "miss," the proper conversion must be fetched from memory. Traditionally, this has been accomplished by microcode or software. When the "miss" occurs, a trap is taken to a routine that makes the necessary address calculations, memory references, and validity checks. The proper conversion is loaded into the translation buffer and control returns from the trap routine to the original flow of the program.

This method of resolving translation buffer "misses" is a relatively slow process because the microcode or software routine uses a data path which is not optimized for translation buffer "misses". Thus, the time to enter and return from a trap routine can be quite long. Further, in a pipelined computer, with multiple memory operations in process at any one time, the translation buffer "miss" routine can be exceedingly complex. The routine requires that the pipeline order be preserved, the "missed" memory reference inserted at the front of the pipeline, and the pipeline restarted at the end of the routine. Finally, during execution of the translation buffer fixup routine the software and microcode are not doing their normal instruction execution.

SUMMARY OF THE INVENTION

To correct "misses" in the translation buffer at the time of their occurrence, rather than at the microcode level, and to check for access violations, a memory management processor is provided for controlling the conversion of virtual memory addresses to physical memory addresses in a digital computer system. The digital computer system has an instruction unit, an execution unit, a memory, and a translation buffer having a cache of previously converted virtual addresses. The translation buffer is adapted for delivering the physical addresses corresponding to the virtual addresses delivered by the instruction and execution units. The memory management processor includes means for calculating a physical memory address containing the physical memory address corresponding to the received virtual address in immediate response to receiving the virtual address. Means retrieves the physical memory address corresponding to the received virtual address from the calculated physical memory address in response to the virtual address being absent from the translation buffer cache. Means stores the retrieved physical memory address in the translation buffer cache.

Preferably the memory management processor checks for access violations, page faults, length violations, and modify faults during the correction of a translation buffer "miss". These faults are processed and forwarded to the next pipeline stage without disrupting the instruction pipeline.

A method of operating a digital computer is also provided. The digital computer includes an instruction unit, an execution unit, a memory, a translation buffer for converting virtual addresses delivered by the instruction and execution units to physical addresses within the memory, and a memory management processor. The method includes the following steps: receiving the virtual addresses; comparing the virtual addresses to a cache of previously converted virtual addresses in the translation buffer; delivering the translated physical address corresponding to the previously converted virtual address in response to a match between the received virtual address and the previously converted virtual address; delivering a miss signal in response to the absence of a match between the received virtual address and the previously converted virtual addresses; calculating a physical memory address containing the physical memory address corresponding to the received virtual address prior to receiving the miss signal; and performing the following steps in response to receiving the miss signal: retrieving the physical memory address corresponding to the received virtual address from the calculated physical memory address; and storing the retrieved physical memory address in the cache of the translation buffer.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
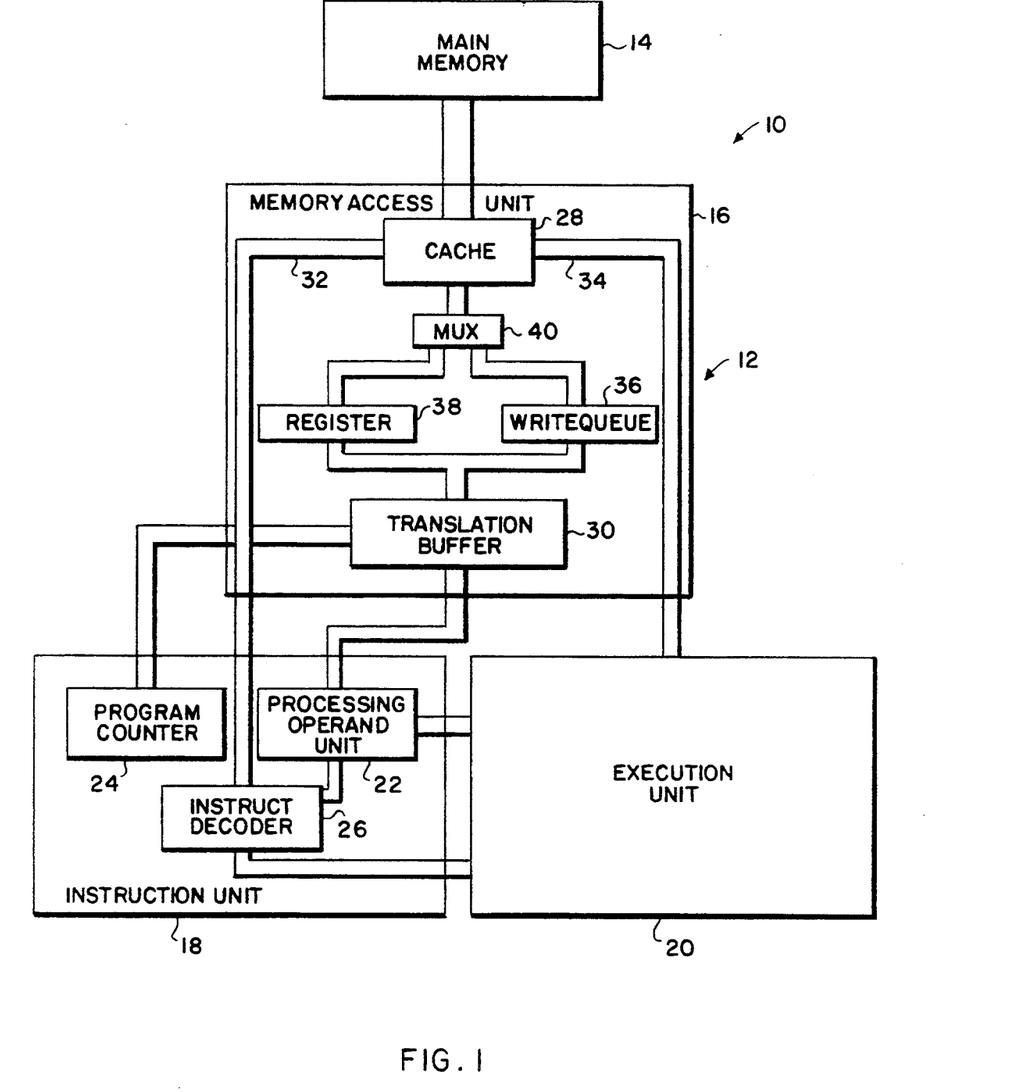
FIG. 1 is a top level block diagram of a portion of a central processing unit and associated memory.

FIG. 1 is a top level block diagram of a portion of a pipelined computer system 10. The system 10 includes at least one central processing unit (CPU) 12 having access to main memory 14. It should be understood that additional CPUs could be used in such a system by sharing the main memory 14. It is practical, for example, for up to four CPUs to operate simultaneously and communicate efficiently through the shared main memory 14.

Inside the CPU 12, the execution of an individual instruction is broken down into multiple smaller tasks. These tasks are performed by dedicated, separate, independent functional units that are optimized for that purpose.

Although each instruction ultimately performs a different operation, many of the smaller tasks into which each instruction is broken are common to all instructions. Generally, the following steps are performed during the execution of an instruction: instruction fetch, instruction decode, operand fetch, execution, and result store. Thus, by the use of dedicated hardware stages, the steps can be overlapped, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process is analogous to an assembly line in a manufacturing environment. Each worker is dedicated to performing a single task on every product that passes through his or her work stage. As each task is performed the product comes closer to completion. At the final stage, each time the worker performs his assigned task a completed product rolls off the assembly line.

As shown in FIG. 1, each CPU 12 is partitioned into at least three functional units: the memory access unit 16, the instruction unit 18, and the execution unit 20.

The instruction unit 18 prefetches instructions, decodes opcodes to obtain operand and result specifiers, fetches operands, and updates the program counter. The instruction unit 18 includes an operand processing unit 22, a program counter 24, and an instruction decoder 26. The program counter 24 is maintained in the instruction unit 18, so that the proper instructions can be retrieved from a high-speed cache memory 28 maintained in the memory access unit 16. The cache 28 stores a copy of a small portion of the information stored in main memory 14 and is employed to increase processing speed by reducing memory access time. Operation of the cache 28 is described in greater detail in conjunction with the description of the memory access unit 16.

The program counter 24 preferably uses virtual memory locations rather than the physical memory locations of main memory 14 and cache 28. Thus, the virtual address of the program counter 24 must be translated into the physical address of main memory 14 before instructions can be retrieved. Accordingly, the contents of the program counter 24 are transferred to the memory access unit 16 where a translation buffer 30 performs the address conversion. The instruction is retrieved from its physical memory location in cache 28 using the converted address. The cache 28 delivers the instruction over the data return lines 32 to the instruction decoder 26. The organization and operation of a prior art cache and translation buffer are further described in Chapter 11 of Levy and Eckhouse, Jr., Computer Programming and Architecture, The VAX-11, Digital Equipment Corporation, pp. 351-368 (1980).

The operand processing unit (OPU) 22 also produces virtual addresses. In particular, the OPU 22 produces virtual addresses for memory source (read) and destination (write) operands. For at least the memory read operands, the OPU 22 must deliver these virtual addresses to the memory access unit 16 where they are translated to physical addresses. The physical memory locations of the cache 28 are then accessed to fetch the operands for the memory source instructions.

In order to practice the preferred method of the present invention, the OPU 22 also delivers to the memory access unit 16 the virtual addresses of the destinations for the memory destination operands. The virtual address, for example, is a 32-bit number. In addition to transmitting the 32-bit virtual address, the OPU 22 also delivers a 3-bit control field to indicate whether the operand specifies a read or write operation. In the event that the control field indicates that the virtual address corresponds to a read operand, the cache 28 retrieves the data from the identified physical memory location and delivers it over data return lines 34 to the execution unit 20.

Conversely, for a write operation the write address is stored until the data to be written is available. Clearly, for instructions such as MOVE or ADD, the data to be written is not available until execution of the instruction has been completed. However, the virtual address of the destination can be translated to a corresponding physical address during the time required for execution of the instruction. Also, it is desirable for the OPU 22 to pre-process multiple instruction specifiers during this time in order to increase the overall rate at which instructions are performed. For these purposes, the memory access unit 16 is provided with a "write queue" 36 intermediate the translation buffer 30 and cache 28 for storing the physical destination addresses of a variable number write operations. The write queue 36 maintains the address until the execution unit 20 completes the instruction and sends the data to the memory access unit 16. The data is paired with the previously stored write address and written into the cache 28 at that memory location.

The OPU 22 also operates on instructions which are not memory operands. For example, the OPU 22 also processes immediate operands, short literals and register operands. In each of these types of instructions the OPU 22 delivers its results directly to the execution unit 20.

The first step in processing the instructions is to decode the "opcode" portion of the instruction. The first segment of each instruction consists of its opcode, which specifies the operation to be performed in the instruction. The decoding is done using a standard table-look-up technique in the instruction decoder 26. The instruction decoder finds a microcode starting address for executing the instruction in a look-up table and passes the starting address to the execution unit 20. Later the execution unit performs the specified operation by executing prestored microcode, beginning at the indicated starting address. Also, the decoder determines where source and destination specifiers occur in the instruction and passes these source and destination specifiers to the operand processing unit 22 for pre-processing prior to execution of the instruction.

The memory access unit 16 includes the cache 28, the translation buffer 30, the write queue 36, a register 38, and a multiplexer 40. As noted above, the cache 28 is a high speed memory used for storing a copy of a small portion of the information stored in the main memory 14. The cache 28 is accessible at a much higher rate than the main memory 14. Its purpose, therefore, is to reduce the average time necessary for a memory access (i.e., a read or write) to be performed. Since the cache 28 stores only a small portion of the information stored main memory, there will occasionally be instructions which attempt to access memory not contained in the cache 28. The cache 28 recognizes when these "misses" occur, and in these instances the cache 28 retrieves the identified data from main memory 14. Of course, during these "misses" performance of the CPU 12 will suffer, but the overall memory access speed is increased.

The translation buffer 30 is a high-speed, associative memory which stores the most recently used virtual-to-physical address translations. In a virtual memory system, a reference to a single virtual address can cause several memory references before the desired information is made available. However, where the translation buffer 30 is used, translation is reduced to simply finding a "hit" in the translation buffer 30. The use of the translation buffer 30 reduces the number of times memory must be accessed and thereby increases overall processor speed. Of course, the memory references will occasionally "miss" on those translations stored in the translation buffer 30 In the event of a "miss," the proper virtual-to-physical address translation is retrieved from memory and stored in the translation buffer 30. The comparison is attempted a second time, necessarily resulting in a "hit"z. At this time it should be noted that memory is divided into two separate areas: process and system memory. Memory references to these two areas are treated slightly differently during a translation buffer "miss" and will be discussed in greater detail in conjunction with FIGS. 3, 4, and 5.

Once the virtual-to-physical address translation is complete, the physical address is transferred to one of the write queue 36 and the register 38. As its name suggests, the write queue 36 receives the physical address only if the corresponding instruction is a write to memory. The purpose of the write queue 36 is to provide a temporary storage location for the physical write address of the write instruction. Because of the pipeline nature of the CPU 12, the write address is available before the data to be stored there. In fact, the data will only become available after the execution of the instruction in the execution unit 20. Moreover, because it is desired to pre-process multiple specifiers for instructions in the pipeline, it is likely that there will be a plurality of physical write addresses waiting for their corresponding data. Accordingly, the write queue 36 is a multiple position first-in, first-out buffer to accommodate a plurality of physical write addresses.

Conversely, if the instruction corresponding to the physical address is a read instruction, then the translation buffer 30 provides the physical address for an operand of the read instruction. The read address is transferred to the register 38 where it is selected by the multiplexer 40 and delivered to the cache 28. The cache 28 accesses the identified memory location and delivers the data stored at that location to the execution unit 20 via the data return lines 34.

The ability of the CPU 12 to immediately access the cache 28 during operand fetch for the reads, but being delayed during instruction execution for the writes, can cause timing problems in the pipeline. For example, sequential instructions often require the first instruction to modify a memory location while the subsequent instruction reads this same address. Since both instructions are being executed in a series of smaller steps it is possible for the read and write operations to be performed out of sequence. Even though the specifiers for the write instruction are processed before the specifiers for the read instruction, and the write operation is executed before the read operation, the delay in execution may allow one or more operands for the read operation to be fetched before the result of the write operation is stored. Therefore, as a result of the fetch of the read operands, "stale" data might be returned to the execution unit.

Figure 2:
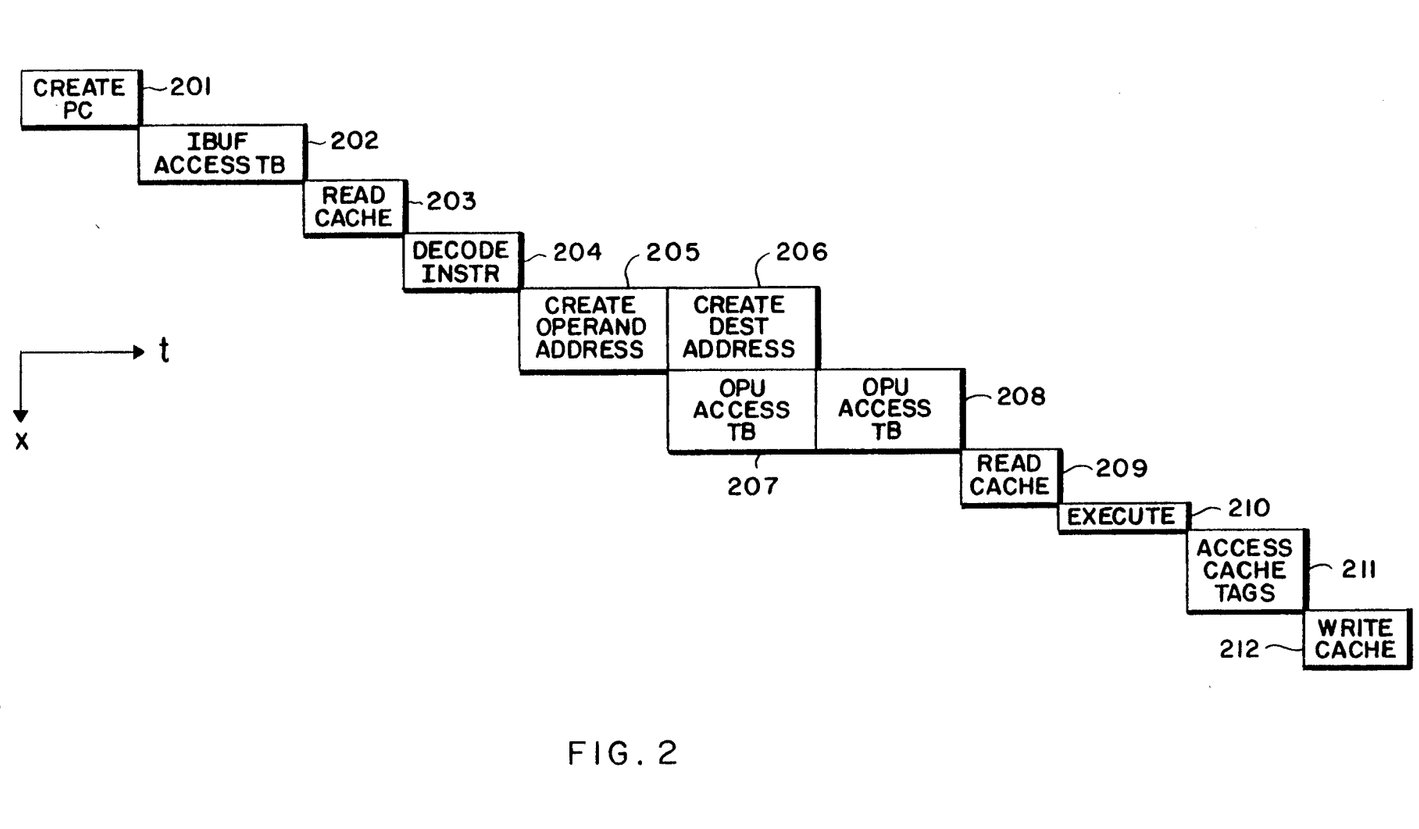
FIG. 2 is a functional diagram of the pipeline processing of a longword MOVE operand.

FIG. 2 illustrates the operation of the instruction pipeline for a 4-byte move instruction of the form "MOVL MEM1, MEM2" where MOVL designates the operation to be performed and MEM1 and MEM2 are operand specifiers specifying a source address and a destination address, respectively. The boxes along the diagonal direction in FIG. 2 show the successive actions that CPU 12 takes to perform the move instruction. From left to right in FIG. 2, the actions occur at eleven successively advanced cycles or intervals in time (t). From top to bottom in FIG. 2, the actions occur in ten successive stages along the extent (x) of the pipeline.

In the first stage the program counter (PC) 24 for that instruction is created at location 201. This is done either by incrementing the value of the program counter (24 in FIG. 1) for the previous instruction, or by using the target address of a branch instruction. In the second stage, at location 202, the instruction unit accesses the translation buffer (30 in FIG. 1) with the virtual address of the program counter. The translation buffer converts the virtual address to a physical address and downloads a block of data from the memory unit cache 28 to a buffer or cache (not shown) in the instruction unit. It is only necessary to perform the second stage if the buffer or cache in the instruction unit does not contain the instruction indicated by the PC 24. The cache is read at location 203 in the third stage to retrieve the instruction MOVL indicated by the PC 24. At location 204 the fourth stage decodes the instruction by accessing the decode table with the opcode from MOVL (DO).

Thereafter, in the fifth stage at location 205 the operand virtual address is created from the first argument MEM1. Similarly, at a later time in the fifth stage at location 206, the destination virtual address is created from the second argument MEM2. At this same time in the sixth stage, at location 207, the OPU 22 accesses the translation buffer 30 to convert the operand virtual address into a physical address. Likewise, at a later time in the sixth pipeline stage, at location 208, the OPU 22 accesses the translation buffer 30 to convert the destination virtual address into a physical address.

Of course, the write operation to the physical address corresponding to MEM2 cannot be completed until the data to be stored has been read at the physical address corresponding to MEM2. Thus, the MEM2 address is stored in the write queue 36 until the data is available. The seventh stage at location 209 reads the memory access unit cache 28 and delivers that data to the execution unit 20.

In the eighth stage, at location 210, all of the operand data and result addresses are available, and the instruction is executed. In the ninth stage, at location 211, the data and a write flag are delivered to the memory unit 16, the write queue address is removed from the write queue, and the cache tags are accessed to test for a cache hit. Assuming a cache hit, the actual write occurs in the tenth and final stage at location 212.

Figure 3:
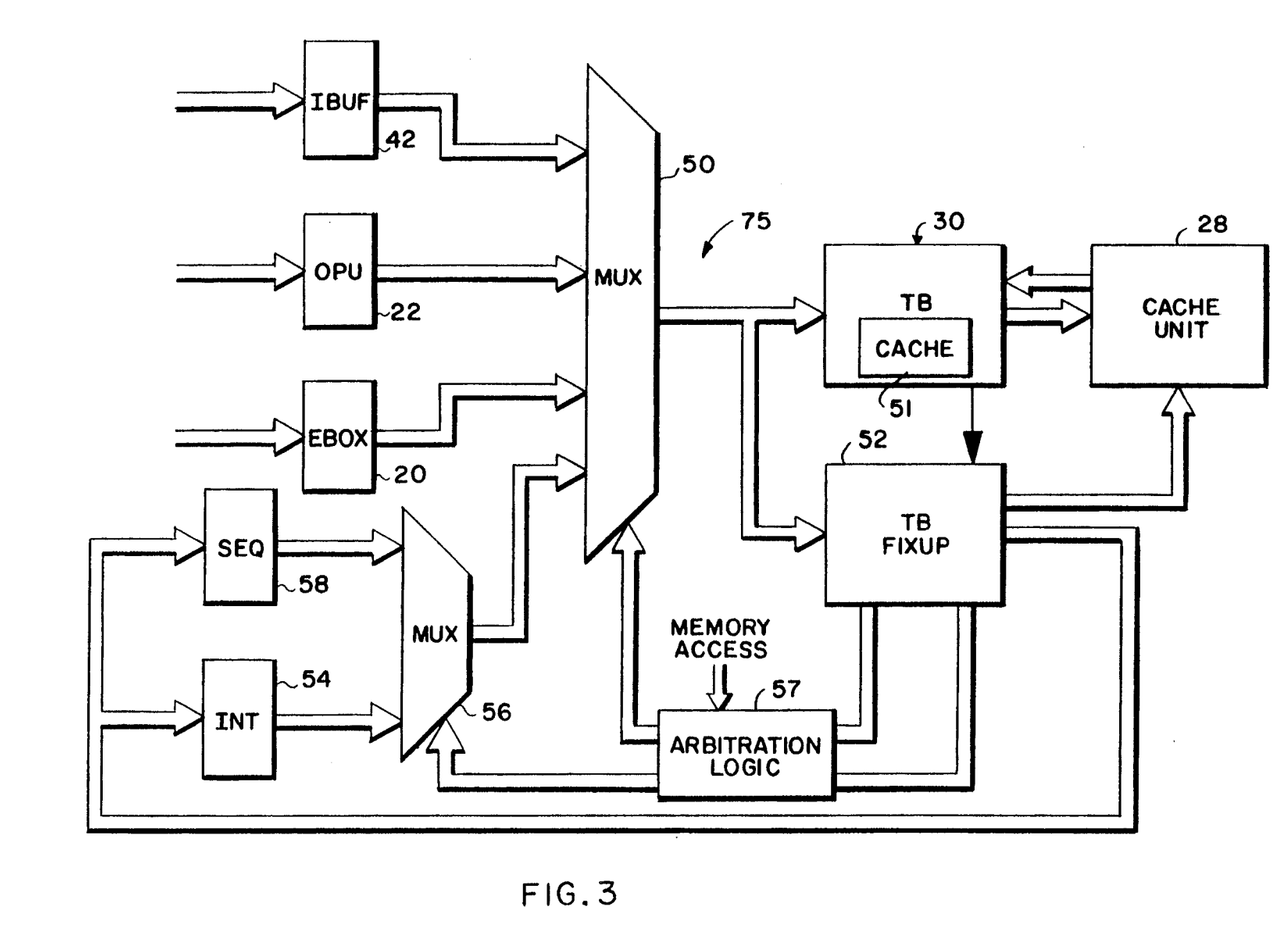
FIG. 3 is a block diagram of the translation buffer and translation buffer fixup unit interfaced with the processor.

Referring now to FIG. 3, the operation of the translation buffer 30 is described in greater detail. The translation buffer 30 is connected to receive virtual addresses from five different sources. Three of these sources are external to the memory access unit 16 and are, hereafter, generally referred to as external. The remaining two sources are controlled from within the memory access unit 16 and are, hereafter, generally referred to as internal. These internal registers are used during translation buffer "misses" to retrieve the virtual-to-physical translation from memory and place it in the translation buffer 30.

The external sources include the I-buffer 42 which is responsible for delivering instruction pre-fetch addresses, the OPU 22 which delivers operand pre-fetch addresses, and the execution unit 20 which delivers implicit operand addresses. The translation buffer 30 is unconcerned with which of the external addresses are being processed, as all are handled identically.

Each of these external sources is delivered to the inputs of a multiplexer 50 which controllably delivers the selected input to the translation buffer 30. The translation buffer 30 compares the received virtual address to a cache 51 of recently used virtual-to-physical address conversions. If a match is found, the translation buffer 30 selects the corresponding physical address and delivers it to the cache 28. There is no need to access the cache 28 to fetch the virtual-to-physical translation since it is already present in the translation buffer cache 51 by virtue of its earlier use. In this respect, the translation buffer 30 greatly enhances processor speed by reducing the number of accesses to memory.

However, the translation buffer cache 51 contains only a small number of the virtual-to-physical translations. Thus, it is possible that the virtual address currently being translated is not present in the translation buffer cache 51. When this happens, it is necessary to retrieve the conversion from memory and place it in the translation buffer cache 51, so that the virtual-to-physical conversion can be completed.

The virtual address delivered by the selected external source is also delivered to a translation buffer fixup unit (TB Fixup) 52. As its name implies, TB Fixup 52 is primarily dedicated to retrieving those conversions not present in the translation buffer cache 51 and placing them in the translation buffer 30. The particular operation of the TB Fixup 52 is controlled by the type of memory access currently being processed. To understand this distinction, it is first necessary to explain the configuration of virtual memory.

Virtual address space is actually broken into several functional regions or segments. First, virtual address space is divided into two halves called system space and process space. Process space is again broken into the program (P0) and control (P1) regions. Each region has a collection of all of the virtual-to-physical address translations for that region of memory. These translations are collectively referred to as page tables while the individual translations are referred to as page table entries (PTE). Each region has its own page table and is defined by two registers: a base register containing the page table starting address and a length register containing the number of page table entries in the table.

The virtual address is a binary number, 32 bits in length with the two high order bits defining the regions of memory. For example, bit 31 defines system and process space. A one in this position indicates system space while a zero identifies process space. Bit 30 further defines the two process regions (P0,P1). The high-address half of process space is the control region (P1) while the low-address half is occupied by the program region (P0).

The high-address half of the address space is called system space because it is shared by all programs in the system and the operating system runs in this region. There is only one page table for system space, the system page table (SPT), that translates all system space references. SPT is described by its two hardware registers, the system base register (SBR) and the system length register (SLR). These registers are loaded by the software when the operating system is booted. It is important to note that SPT must be referenced by physical addresses, since there can be no virtual-to-physical address conversion without the page table itself. For example, in order for the conversion process to begin, the physical address of at least the SPT must be known to retrieve the virtual-to-physical conversions.

The low-address half of memory is called process space because, unlike system space, process space is unique to each program in the system. Each program has its own page table for its program and control regions, and they are defined by the corresponding base and length registers (P0BR, P1BR, P0LR, and P1LR). For example, different programs referencing the same process space virtual address will access different physical memory locations. Accordingly, the process page tables are referenced by virtual, rather than physical, memory addresses. Thus, any conversion of process space virtual addresses must first locate the physical memory location of the process page table. These addresses are available in the physical memory locations of the system page table (SPT). It can be seen that while a conversion of a system memory reference can be accomplished in a single step, a process memory reference must perform two conversions: first, the conversion of the process base register address and second, the conversion of the virtual address itself.

The program region (P0) contains user programs, thereby providing the zero-based virtual address space into which programs expect to be loaded. Conversely, the control region (P1) accommodates the user mode stack of the process. The operating system can also use the control region to contain protected process-specific data and code, as well as the stacks for the higher access modes.

Referring, once again, to FIG. 3, TB Fixup 52 receives the virtual address from the multiplexer 50 and uses bits 30 and 31 to determine the virtual memory region being accessed. The designated region is used to determine which base register should be used to locate the corresponding page table. For a system memory reference, the page table address computed from SBR is a physical address and can be delivered directly to the memory access unit cache 28 where the corresponding virtual-to-physical conversion is stored. However, it is only necessary to fix the translation buffer 30 when a "miss" occurs. Accordingly, the translation buffer 30 delivers a miss signal to the TB Fixup 52 to allow the computed address to be delivered to the cache 28. In the event of a TB "miss" the conversion is retrieved from the cache 28 and stored in the translation buffer cache 51. Thus, the immediately subsequent comparison of the translation buffer cache 51 to the pending virtual address must necessarily result in a "hit". Therefore, TB Fixup 52 temporarily asserts control over the translation buffer 30 to update the translation buffer cache 51, whereby the pending conversion is altered from a "miss" to a "hit" and the virtual-to-physical translation is completed.

Conversely, where the virtual memory region being accessed corresponds to the process region, the address computed from either of the process base registers P0BR, P1BR is a virtual address. This virtual address cannot be delivered to the cache 28, but must first be converted to a physical address. Of course, conversion of virtual to physical addresses is normally accomplished by the translation buffer 30. Since the translation buffer 30 is currently stalled, waiting for TB Fixup 52 to update its cache 51, TB Fixup 52 can assert control over the translation buffer to perform this virtual-to-physical conversion. TB Fixup 52 delivers the computed virtual address of the process page table to an internal register 54 in response to the translation buffer "miss". A multiplexer 56 is selected by TB Fixup 52 to deliver the contents of the internal register 54 to an input of the multiplexer 50. TB Fixup 52 also operates to select the output of the multiplexer 56 as the input to the multiplexer 50. It can be seen that, a translation buffer "miss" on a process memory reference, results in the computed virtual address of the process page table being delivered to the translation buffer 30 for a virtual-to-physical conversion. Thus, a "hit" in the translation buffer 30 at this time results in the physical address being delivered directly to the cache 28 by the translation buffer 30.

It is also possible that a second translation buffer "miss" will result on the address contained in the internal register 54. TB Fixup 52 can also correct this second "miss". It should be noted that this second "miss" is a "miss" of a physical address. Thus, the fixup routine is identical to that used to retrieve the PTE for a system reference "miss". The retrieved PTE is stored in the translation buffer cache and is used to form the physical address of the virtual-to-physical translation on a subsequent pass through the translation buffer 30.

A sequencer 58 also receives input from TB Fixup 52 over the same bus as the internal register 54. The sequencer 58 is employed during multi-precision operations or operations which cross the line boundary where it is necessary to read multiple contiguous bytes from memory. The sequencer 58 increments the address and delivers it to the multiplexer 56. Arbitration logic 57 controls which of the multiplexer inputs are selected to consecutively deliver, first, the internal register address, and second, the incremented address or addresses of the sequencer. All bytes of a multi-precision operation or unaligned address are accessed in this manner.

Figure 4:
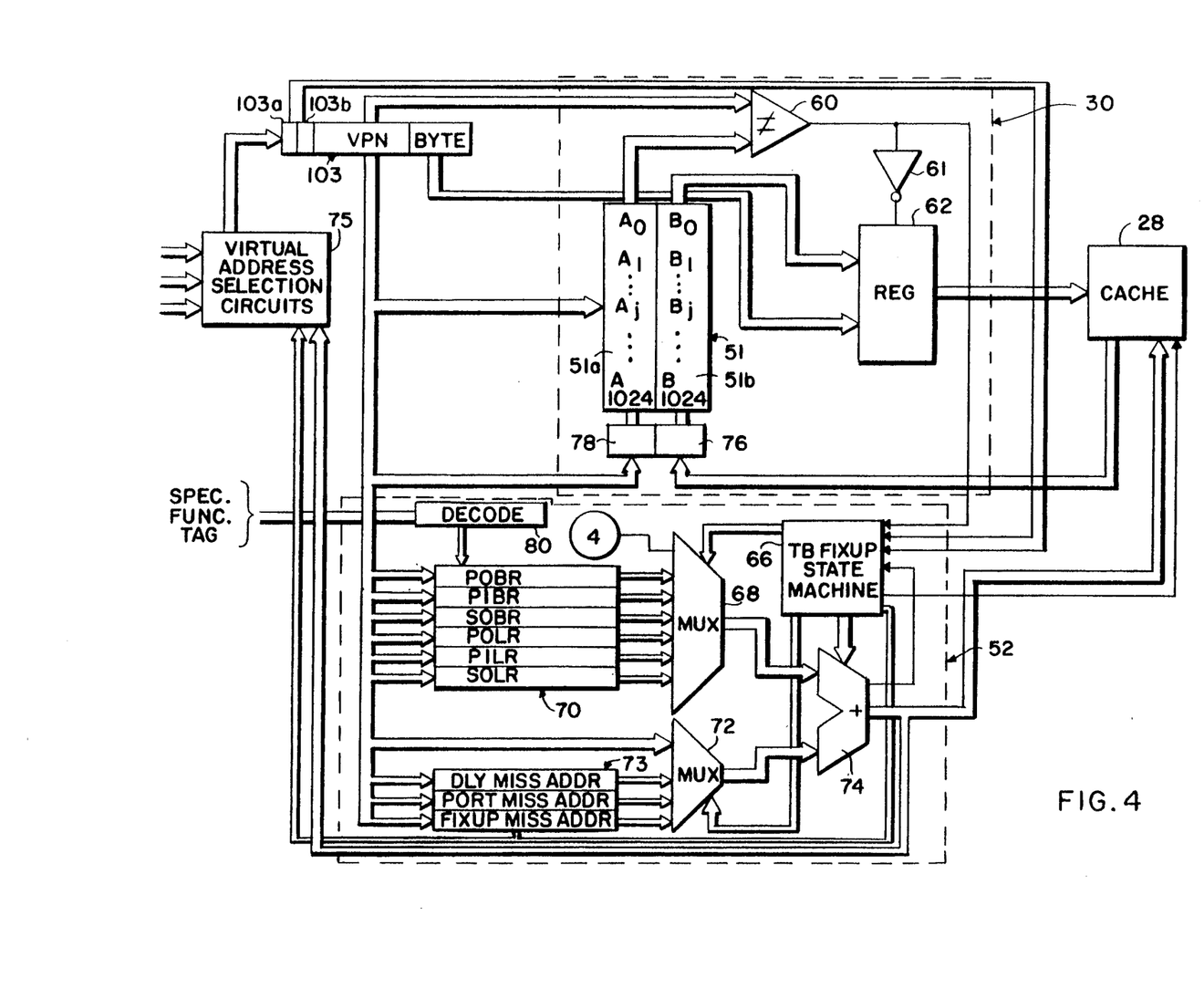
FIG. 4 is a detailed block diagram of the translation buffer and the translation buffer fixup unit.

Referring now to FIG. 4, a detailed block diagram of the translation buffer 30 and TB Fixup 52 is shown. The translation buffer 30 maintains the cache 51 of recently used PTEs. The 32-bit virtual address is received by the translation buffer 30 and bits 31 and 17:09 are used as pointers for the 1024 memory locations of the cache 51.

Each memory location in the cache 51 has a 13-bit tag corresponding to bits 30:18 of the virtual address. These tags are indicated as A0-A1024 and are collectively referred to as the page translation directory 51a. The lower 512 tags correspond to process memory references and the upper 512 tags correspond to system memory references. The purpose of separating the tags into process and system tags is to allow the operating system to quickly invalidate only those tags associated with the current program when a context switch occurs. For example, if these entries are not invalidated when another program begins to execute, this next program could access the wrong physical memory location by generating a process virtual address which had been previously translated by the prior program. Thus, rather than the translation buffer 30 detecting a "miss" a tag match will result based on the virtual-to-physical translation of the prior program.

The system tags need not be invalidated after a context change since all processes share system space and the virtual-to-physical translations will be identical for each process. Consequently, a system memory reference from any program will access the same physical memory location, so there is no need to flush the system tags. Bit 30 separates the process tags from the system tags.

Associated with each of the tags A0-A1024 is a 32-bit data field containing the corresponding PTE and indicated as B0-B1024. The PTE includes the physical page frame number PFN at bits 20:00, a valid bit at bit 31, a protection field at bits 30:27, and a modify bit at bit 26. These PTEs are collectively referred to as the page translation store 51b.

A comparator 60 receives bits 30:18 of the virtual address and the 13-bit tag corresponding to the pointer. A match between these values indicates that the PTE corresponding to the virtual address is located in the page translation store 51b at the location corresponding to the tag bits. Bits 29:09 of the selected PTE are delivered to one input of a register 62. The other input to the register 62 is formed from bits 08:00 of the virtual address. In other words, the corresponding physical page is appended to the byte offset of the virtual address, forming the actual physical address. This physical address is maintained in the register 62 which is clocked by a pulse from the comparator 60 which is inverted by an inverter 61. Thus, the calculated physical address is delivered to the cache 28 only if the comparator 60 indicates that a "hit" was found in the page translation directory 51a.

At the same time, the VPN (bits 29:09) is delivered to the TB Fixup 52. A state machine 66 controls the operation of the TB Fixup 52 in response to control inputs from the comparator 60 (TB miss), and bits 31:30 of the virtual address. The state machine 66 responds to the TB miss signal by calculating the address of the desired PTE. In general, the PTE is determined by adding the VPN and the address of the base register.

Which of the base registers to use is determined from the status of bits 31:30. As discussed previously, there are three separate areas of memory, each having its own unique page table and base address. The state machine 66 interprets the bits 31:30 and delivers a control signal to the select input of a multiplexer 68, whereby the appropriate base register can be selected. The inputs to the multiplexer 68 are connected to a series of six registers 70 containing the base and length registers (POBR, P1BR, SBR, POLR, P1BR, and SLR) of each area of memory.

The state machine 66 also controls the select inputs of a multiplexer 72. During any "miss" in system memory or a first "miss" in process memory, the state machine 66 selects the port miss address input to the multiplexer 72 which contains bits 21:2 of the virtual address. This port miss address is stored in one of a set of registers 73. The lowest order two bits are not needed since the PTE is stored in the cache 28 on longword alignment (4 bytes). The multiplexers 68, 72 deliver their outputs to an adder 74 where they are combined to form the address of the PTE. The address is delivered to the arbitration logic (57 in FIG. 3) in the virtual address selection circuits 75 and to the cache 28.

Along with the address, the state machine 66 delivers request signals to either the arbitration logic (57 in FIG. 3) in the virtual address selection circuits 75 or to the cache 28, depending upon whether the calculated address is a physical or virtual address. The request signals act to enable one of the arbitration logic (75 in FIG. 3) and cache 28. For example, an address calculated from a process base register is a virtual address and cannot be delivered to the cache 28, but must undergo a virtual-to-physical translation in the translation buffer 30. Accordingly, the state machine 66 delivers the request signal to the arbitration logic (57 in FIG. 3) in the virtual address selection circuits 75. As introduced above, the arbitration logic (57 in FIG. 3) operates the multiplexer 50, shown in FIG. 3, so as to deliver the signals from the external registers or the internal registers based upon a priority scheme. The internal registers, sequencer 58 and internal 54, have the highest priority. Thus, when the state machine 66 delivers the request signal to the arbitration logic (57 in FIG. 3), the internal registers are selected over the external registers to allow the TB Fixup routine to proceed without conflict from the external registers.

Conversely, an address calculated from a system base register is a physical address and can be delivered directly to the cache 28 to retrieve the desired PTE. The PTE is retrieved from memory and delivered to a register 76. Bits 30:18 of the corresponding virtual address are delivered to a register 78. The contents of the registers 76,78 are stored at the locations indicated by the pointer, so as to update the translation buffer cache 51 with the most recently used virtual-to-physical translation.

There is a possibility that the second reference to the translation buffer 30, during a process memory "miss", will also result in a "miss". TB Fixup 52 is capable of handling this double "miss". The state machine 66 recognizes the double miss condition when the second consecutive "miss" signal is received from the comparator 60. The state machine 66 selects the system base register via the multiplexer 68 and the fixup miss address via the multiplexer 72. The fixup miss address is obtained from a respective address register in the set of registers 73. The port miss address register in the set of registers 73 remains loaded with the original virtual address which resulted in the first "miss". The adder 74 combines these selected signals to arrive at the physical system address of the process base register. Since this is a system memory reference, the address identifies a physical memory location and can be delivered directly to the cache 28 along with the cache enable signal. Here the process is substantially identical to an original system memory reference, and the cache 28 will respond by delivering the PTE stored at the identified address to the translation buffer cache 51. Thus, when the external register is again selected by the arbitration logic (57 in FIG. 3) the translation buffer 30 will necessarily "hit" on the virtual-to-physical translation.

Before TB Fixup 52 calculates the PTE address, a fault check is performed to determine if the virtual address has violated a length parameter of the page table. More simply stated, the number of available pages in an area of memory is known, and a virtual page that is greater than the number of pages in memory must be the result of a system error. The adder 74 is used to make this comparison. The state machine 66 configures the adder 74 to perform a 2's complement subtraction by inverting the inputs from the multiplexer 72 and enabling the carry in bit. For this process, the two lowest order bits are necessary for the calculation, so rather than selecting the port miss address input, the state machine selects the delay miss address input to the multiplexer 72 to retrieve bits 21:0 of the virtual address. The delay miss address is obtained from a respective register in the set of registers 73.

The state machine 66 also selects the length register 70 corresponding to the area of memory being translated. Thus, by subtracting the virtual address from the known length of the page table, a negative result indicates that the virtual address is attempting to access a nonexistent PTE. Alternatively, a positive result indicates no length violation exists and the fixup process is allowed to proceed.

The state machine 66 monitors this process via the carry out bit of the adder 74. If the carry out bit is asserted, the result is negative and a fault command is issued to the execution unit 16.

In addition to correcting "misses" in the translation buffer 30, the TB Fixup 52 also aids in retrieving data during multi-precision operations. These multi-precision instructions require access to multiple memory locations even though only a single memory location is identified in the instruction. Thus, while the first memory reference is passed to the translation buffer 30, TB Fixup 52 calculates the next sequential address and delivers it to the sequencer 58. The virtual address is delivered to the zero input of the multiplexer 72 and selected by the state machine 66. At the same time, a constant, having a value of four, is located at the zero input of the multiplexer 68 and is selected by the state machine 66. Therefore, the output of the adder 74 is the virtual address of the next longword needed for the multi-precision instruction. This address is delivered to the virtual address selection circuits 75 where it is given priority over the external registers so that it is translated to a physical address by the translation buffer 30.

Finally, the process for loading the base and length registers 70 is controlled by the execution unit 16 during the initialization phase of the CPU. The execution unit 16 provides a 4-bit tag address and an enable signal to a decoder 80. The decoder 80 responds by enabling the corresponding register 70 to input the data present in the virtual address. The process is repeated for each of the base and length registers 70 until all of the registers have been loaded with the appropriate data.

Figure 5A:
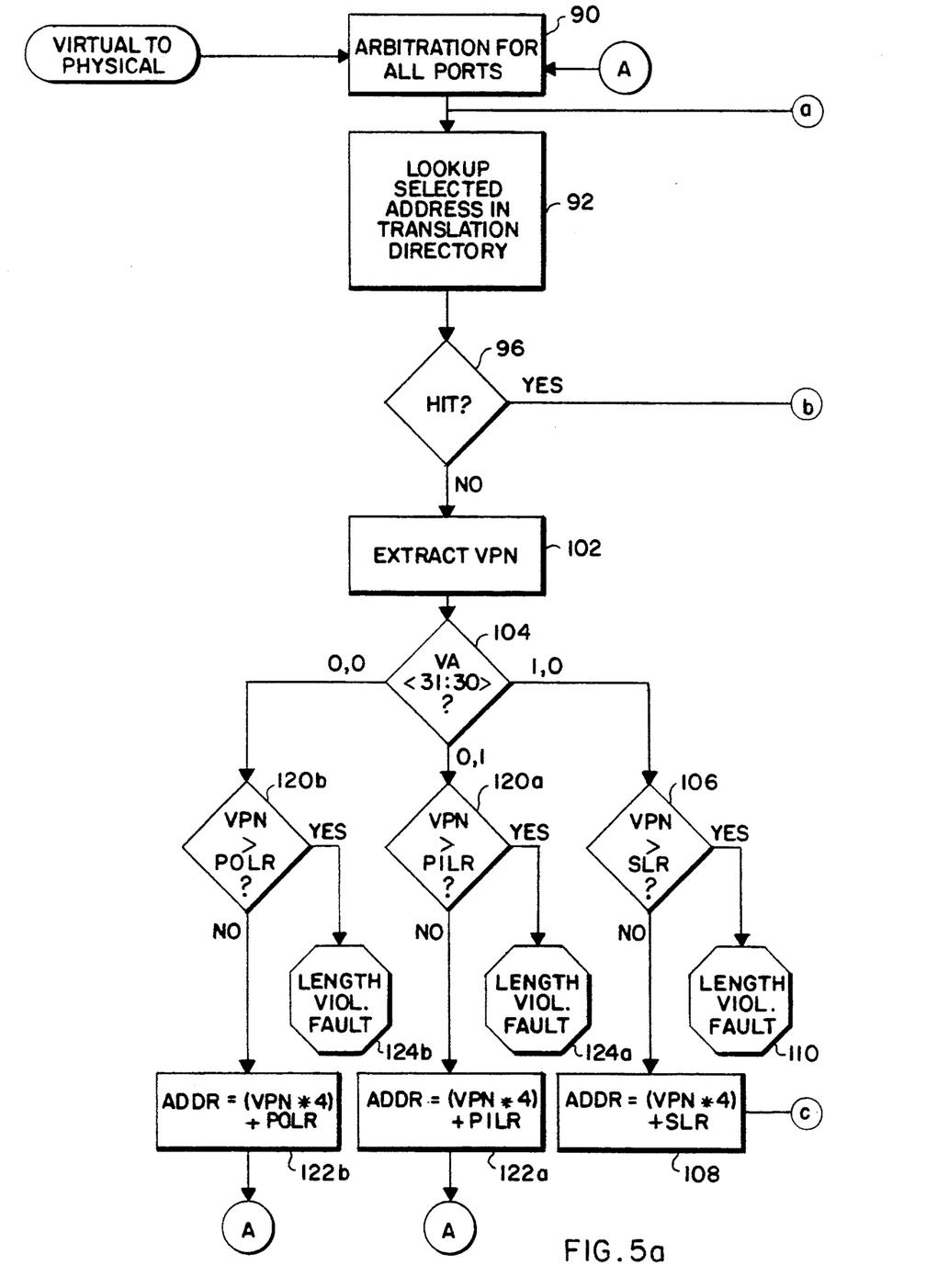
FIGS. 5a and 5b show a flowchart illustrating various conditions which are tested and corresponding actions which are taken for retrieving physical memory addresses from the translation buffer and updating the translation buffer on address "misses".
Figure 5B:
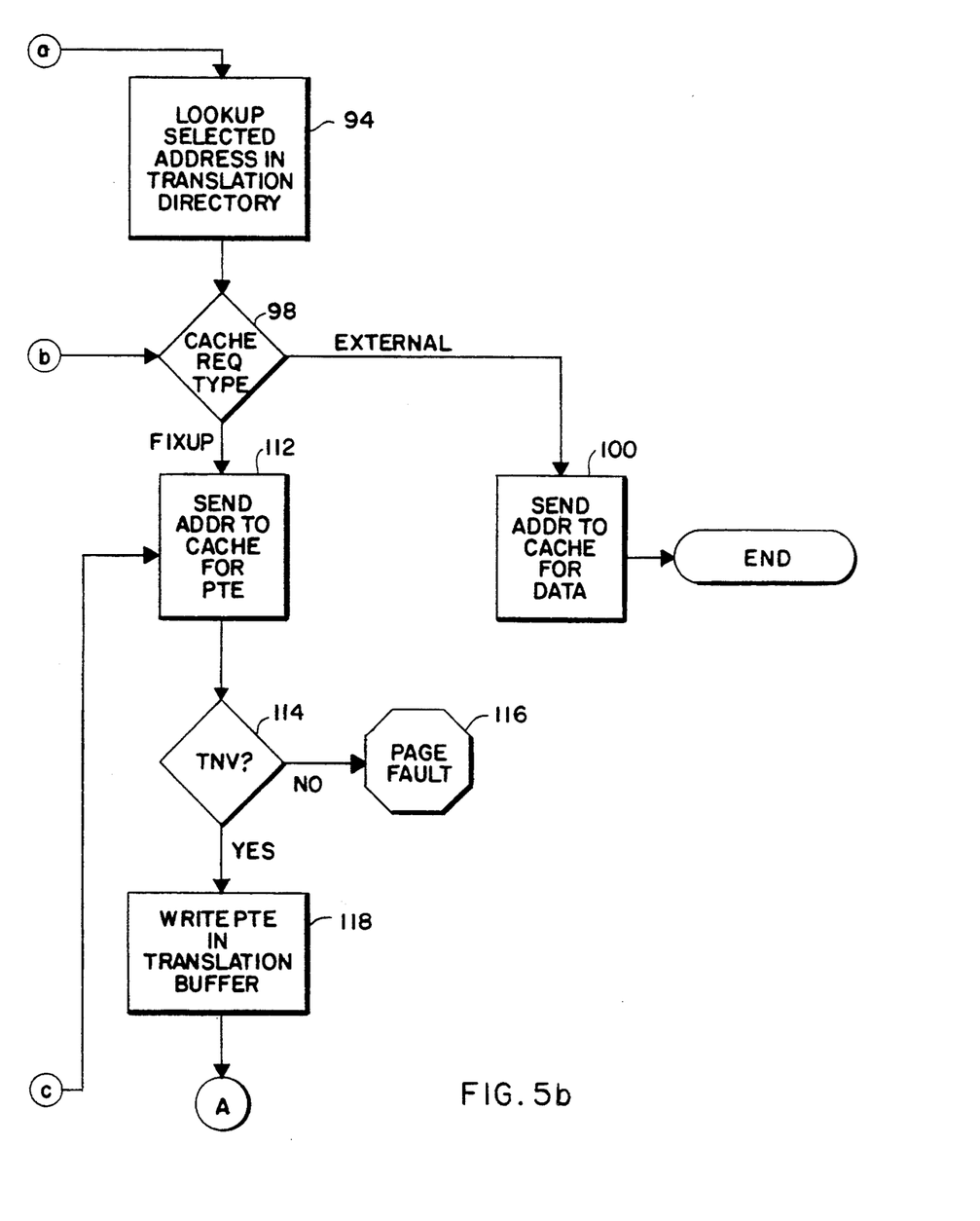

Referring now to FIG. 5, a process flow chart of the possible logic paths taken in FIGS. 4 and 5 is shown. There are four possible paths that a virtual-to-physical translation can follow. First, and simplest, the translation buffer 30 contains the desired translation for either a process or system memory reference and the converted physical address is delivered directly to the cache 28. The process begins at step 90 with arbitration logic controlling the multiplexer 50 to select one of the sources: IBUF 51, OPU 22, execution unit 20, or a fixup request from the TB Fixup 52. The virtual address is delivered to the translation buffer 30, and in step 92 the selected address is compared to the addresses in the page translation directory (51a in FIG. 4). At the same time in step 94, the PTE corresponding to this selected address is retrieved from the page translation store (51b in FIG. 4). A match is found and the "hit" causes decision block 96 to deliver a signal to step 98 indicating to the cache 28 that there is a valid physical address with which to perform a lookup. In step 94 the PTE protection bits are also inspected to ensure that access is permitted. If access is not permitted, an access violation fault is set and a microcode routine assumes control of the processor to correct the fault. Assuming that the request originated from an external source, then control passes to step 100 where the process is completed by sending the address to the cache 28 in order to retrieve the desired data. On the other hand, if the request originated from the TB Fixup 52, then the control path would branch from that discussed in the first example. The control path for a TB Fixup request is discussed more fully in conjunction with the nth example below.

A second possible logic path occurs when a system memory reference is not present in the translation buffer 30. When there is a "miss" in decision block 96, the translation buffer 30 halts and TB Fixup 52 proceeds to correct the "miss". The physical address of the system page table is calculated, so that the PTE can be retrieved from the page table. To calculate this physical address, the virtual page number VPN is extracted from the virtual address at step 102. (This extraction is performed by bus wiring generally designated 103 in FIG. 4 that connects the other components in FIG. 4 to the address lines for the address bits corresponding to the VPN portion of the virtual address.) At step 104 the page table length and base registers are selected to be SLR and SBR by using bits 31 and 30 of the virtual address. SLR is compared to the VPN in decision step 106 to ensure that a length violation fault does not exist. (In other words, the TB fixup state machine 66 in FIG. 4 tests the states of the virtual address bus lines 103a and 103b corresponding to bits 31 and 30, in order to set the select inputs of the multiplexers 68 and 72 to perform the required comparison by operating the adder unit 74 to subtract the output of one of the multiplexers from the other, and to look at the sign bit of the result.)

Assuming no length violation, control transfers to step 108 where the physical address of the desired PTE is calculated using the following formula:

$$ADDR = PBR + (VPN*4).$$

Conversely, if a length violation exists, control transfers to step 110 where the execution unit 20 is signaled to correct the fault.

Through this point the logic path for a system miss is virtually identical to a process miss, but here the two diverge because the address calculated for a system miss is a physical address and can be sent directly to the cache 28. To differentiate between a system and process reference, bit 31 of the virtual address is inspected at step 104. As discussed previously, a one in bit 31 of the virtual address indicates a system memory reference.

For a system reference, control transfers to step 112 where TB Fixup 52 sends the physical address to the cache 28 and the PTE is retrieved. The valid bit (TNV) in the PTE is inspected at decision block 114 to determine if the addressed physical page is located in the cache 28 or must be retrieved from main memory 14. If the valid bit is not set, the page fault flag is set in step 116 and control passes to execution unit 20 to handle the fault. Otherwise, control transfers to step 118 and the PTE is stored in the page translation store (51b in FIG. 4) at a location corresponding to the virtual address location in the page translation directory (51a in FIG. 4).

With the translation buffer cache updated with the new PTE, control returns to the beginning of the routine. Arbitration logic (57 in FIG. 3) once again selects the external sources in step 90 via the multiplexer 50 and the translation buffer process begins anew. However, because of the immediately prior update, there must now necessarily be a "hit" in the translation buffer 30. Therefore, the first logic path is followed on this pass and the converted physical address is delivered to the cache 28.

The third and fourth possible logic paths occur when a process memory reference is not present in the translation buffer 30. To correct the translation buffer 30 during a process memory reference it is necessary to first locate the process page table. However, the process page table address is also a virtual memory address and so it must also be converted to a physical address. Accordingly, it can be seen that there are two possible logic paths following an initial "miss" at step 96. For example, the subsequent conversion of the virtual process page table address can result in either a subsequent "hit" or "miss" in the translation buffer 30.

First, consider the third possible logic path where a process memory reference "miss" is followed by a process page table "hit". As in the previously discussed logic path, the comparison of the virtual address delivered by an external source results in step 96 detecting a "miss" in the translation buffer 30, at which time the translation buffer 30 operation is halted and TB Fixup 52 begins the process of correcting the "miss" in the translation buffer 30. The virtual location of the process page table is calculated in steps 120-124 nearly identically to the calculation of the physical location of the system page table discussed in conjunction with the second possible logic path. It should be noted that there are actually two parallel paths 120a-124a, 120b-124b only one of which is taken depending upon the region of process memory which is to be accessed. The two parallel paths are identical except for the values retrieved for the base and length registers. At step 104 the process length and base registers are selected using bits 31 and 30 of the virtual address, rather than the corresponding system base and length registers. Thus, at step 122 the address is calculated and transmitted to the internal register 54 and the multiplexers (50, 56 in FIG. 3) are selected by the arbitration logic (57 in FIG. 3) at step 90 to deliver the virtual address to the translation buffer 30.

Alternatively, assume a comparison made in the translation buffer 30 results in a "hit" at decision block 96. It should be remembered that this "hit" is not the ultimate physical address corresponding to the original virtual address, but instead, is the physical address of the PTE used to calculate the ultimate physical address. Thus, decision block 98 transfers control to steps 112-118 where the translation buffer 30 sends this physical address to the cache 28 to retrieve the PTE, check for page faults, and stores the PTE in the translation buffer store. Control returns to the beginning of the routine where the external sources are selected at step 90, the comparison is made in the translation buffer 30, and a "hit" necessarily results during this pass through decision block 96. The PTE is retrieved and the physical address is calculated, thereby completing the translation process. It should be apparent that the successful completion of any of the four logic paths will be a final pass through the first logic path.

Finally, the fourth possible logic path is similar to the third path, but differs slightly, in that, the virtual address of the process page table also "misses" in the translation buffer comparison at decision block 96. In this logic path, TB Fixup 52 is required to correct two translation buffer "misses".

The PTE of the process page table is necessarily located in physical memory. If it were otherwise, the virtual-to-physical conversion could not be completed. That is to say, if the PTE for the process page table were located in virtual memory the virtual memory address would not be known without the PTE, which would not be known without the virtual address. Clearly this is an impossible condition to satisfy, so the PTE for the process page table must be located in physical memory. Thus, the address calculated in steps 120-124 by TB Fixup 52 is a physical address which can be delivered to the cache 28 to retrieve the PTE needed to complete the ultimate conversion.

After the "miss" of the process page table virtual address, steps 120-124 cause TB Fixup 52 to calculate the physical address of the PTE for the ultimate conversion. A second pass through the control routine necessarily results in a "hit" at step 96. However, since the request is from the TB Fixup 52 rather than an external unit, decision block 98 transfers control to steps 112-118 and TB Fixup 52 sends the address to the cache 28 and the PTE is retrieved and stored in the page translation store (51b in FIG. 4). Thereafter the arbitration logic (57 in FIG. 3) selects the external sources at step 90 and the conversion is attempted a second time beginning at step A and following the first logic path with the proper PTE stored in the translation buffer 30. A "hit" must necessarily follow, with the calculation of the corresponding physical address, and delivery of the address to the cache 28.

We claim:

1. A memory access unit for controlling access to a memory by a data processing unit of a digital computer system, said data processing unit providing a plurality of virtual addresses to said memory access unit and said memory access unit providing a corresponding plurality of physical addresses to said memory, said memory having a plurality of memory locations, each of said memory locations storing one of the plurality of physical addresses, said memory access unit comprising:

a translation buffer including:
  a) a translation buffer cache of previously converted virtual addresses and corresponding physical addresses,
  b) means for comparing a current virtual address to the translation buffer cache of previously converted virtual addresses and delivering one of a miss and hit signal in response to respectively detecting an absence and presence of a match between the current virtual address and one of said previously converted virtual addresses, and
  c) means responsive to receiving said hit signal for delivering to said memory the physical address from said translation buffer cache corresponding to the current virtual address; and a memory management processor for updating said translation buffer cache in response to receiving said miss signal, said memory management processor including:
a) means for calculating a memory address of one of said memory locations containing the physical address corresponding to said current virtual address,
b) means for retrieving the physical address corresponding to said current virtual address from the memory using the calculated memory address from the means for calculating, and
c) means for storing in said translation buffer cache the retrieved physical address in correspondence with said current virtual address;
wherein said translation buffer and said means for calculating are interconnected for receiving and operating concurrently upon a same virtual address from the data processing unit so that said means for calculating performs the calculation of the memory address of the memory location containing the physical address concurrently with the translation buffer performing the comparing of the current virtual address to the translation buffer cache of previously converted virtual addresses.

2. The memory access unit as claimed in claim 1, wherein said memory includes system and process memory sections, said means for calculating includes means for differentiating between a system virtual address and a process virtual address, and said means for retrieving includes means for delivering the calculated memory address of a system virtual address to said memory and delivering the calculated memory address of a process virtual address to said translation buffer.

3. The memory access unit as claimed in claim 2, wherein said means for calculating includes means for comparing the system virtual address to a predefined first limit and delivering a fault signal to said data processing unit in response to the system virtual address exceeding said predefined first limit, and means for comparing the process virtual address to a predefined second limit and delivering a fault signal to said data processing unit in response to the process virtual address exceeding said predefined second limit.

4. (Amended) The memory access unit as claimed in claim 1, wherein said means for calculating includes means for comparing the current virtual address to a predetermined limit and delivering a fault signal to said data processing unit in response to the current virtual address exceeding said predetermined limit.

5. The memory access unit as claimed in claim 1, wherein said data processing unit includes means for performing multi-precision operations upon data retrieved sequentially from memory in a predefined sequence, said means for calculating includes an arithmetic unit, and said memory access unit includes means for operating said arithmetic unit for sequentially producing the memory addresses in said sequence one at a time in response to receiving said hit signal.

6. The memory access unit as claimed in claim 1, wherein said memory access unit includes a state machine controlling said means for calculating, said means for retrieving, and said means for storing.

7. A memory management processor for controlling conversion of a plurality of virtual addresses to a corresponding plurality of physical addresses in a digital computer; said digital computer having a data processing unit providing said virtual addresses, a memory receiving said physical addresses, said memory having a plurality of memory locations, each of said memory locations storing one of the plurality of physical addresses, and a translation buffer including a translation buffer cache of previously converted virtual addresses and corresponding physical addresses; said translation buffer cache having means for comparing a current virtual address from said data processing unit to the translation buffer cache of previously converted virtual addresses, and delivering one of a miss and hit signal in response to respectively detecting an absence and presence of a match between the current virtual address and one of said previously converted virtual addresses, and means responsive to receiving said hit signal for delivering to said memory the physical address from said translation buffer cache corresponding to the current virtual address; said memory management processor comprising, in combination:
means for calculating a memory address of one of said memory locations containing said physical address corresponding to said current virtual address, wherein said means for calculating is operative concurrently with said means for comparing said current virtual address to the translation buffer cache of previously converted virtual addresses;
means for retrieving said physical address corresponding to said current virtual address from the memory using the calculated memory address from the means for calculating in response to said miss signal;
means for storing in said translation buffer cache said retrieved physical address in correspondence with said current virtual address; and
control means for operating said means for calculating concurrently with each of said virtual addresses being received by said translation buffer from said data processing unit and compared to the translation buffer cache of previously converted virtual addresses, and for controlling said means for retrieving and said means for storing in response to said miss signal, wherein said control means is a sequential state machine.

8. The memory management processor as claimed in claim 7, wherein said memory includes system and process memory sections, said means for calculating includes means for differentiating between a system virtual address and a process virtual address, and said retrieving means includes means for delivering the calculated memory address of a system virtual address to said memory and delivering the calculated memory address of a process virtual address to said translation buffer.

9. The memory management processor as claimed in claim 8, wherein said means for calculating includes means for comparing the system virtual address to a predefined first limit and delivering a fault signal to said data processing unit in response to the system virtual address exceeding said predefined first limit, and means for comparing the process virtual address to a predefined second limit and delivering a fault signal to said data processing unit in response to the process virtual address exceeding said predefined second limit.

10. The memory management processor as claimed in claim 7, wherein said means for calculating includes means for comparing the current virtual address to a predetermined limit and delivering a fault signal to said data processing unit in response to the current virtual address exceeding said predetermined limit.

11. The memory management processor as claimed in claim 7, wherein said data processing unit includes means for performing multi-precision operations upon data retrieved sequentially from memory in a predefined sequence, said means for calculating includes an arithmetic unit, and said memory access unit includes means for operating said arithmetic unit for sequentially producing the memory addresses in said sequence one at a time in response to receiving said hit signal.

12. A method of controlling conversion of a plurality of virtual addresses to a corresponding plurality of physical addresses in a digital computer; said digital computer having a data processing unit providing said virtual addresses, a memory receiving said physical addresses, said memory having a plurality of memory locations, each of said memory locations storing one of the plurality of physical addresses, and a translation buffer including a translation buffer cache of previously converted virtual addresses and corresponding physical addresses; said translation buffer cache having means for comparing a current virtual address from said data processing unit to the translation buffer cache of previously converted virtual addresses, and delivering one of a miss and hit signal in response to respectively detecting an absence and presence of a match between the current virtual address and one of said translation buffer cache of previously converted virtual addresses, and means responsive to receiving said hit signal for delivering to said memory the physical address from said translation buffer cache corresponding to the current virtual address; said method comprising the steps of:

concurrently with said translation buffer comparing the current virtual address from said data processing unit to the translation buffer cache of previously converted virtual addresses, operating an arithmetic unit to calculate a memory address of one of said memory locations containing said physical address corresponding to said current virtual address;

retrieving said physical address corresponding to said current virtual address from the memory using the calculated memory address from the arithmetic unit when said miss signal is delivered, and storing the retrieved physical address in said translation buffer cache; and retrieving the physical address corresponding to said current virtual address from the translation buffer cache when said hit signal is delivered.

13. The method of controlling the conversion of virtual memory addresses to corresponding physical memory addresses as claimed in claim 12, wherein said memory includes system and process memory sections, said step of operating said arithmetic unit includes differentiating between a system virtual address and a process virtual address, and said step of retrieving includes delivering the calculated address of a system virtual address to said memory and delivering the calculated address of a process virtual address to said translation buffer.

14. The method of controlling the conversion of virtual memory addresses to corresponding physical memory addresses as claimed in claim 13, wherein said step of operating said arithmetic unit includes comparing the system virtual address to a predefined first limit and delivering a fault signal to said data processing unit in response to the system virtual address exceeding said predefined first limit, and comparing the process virtual address to a predefined second limit and delivering a fault signal to said data processing unit in response to the process virtual address exceeding said predefined second limit.

15. The method of controlling the conversion of virtual memory addresses to corresponding physical memory addresses as claimed in claim 12, wherein said step of operating said arithmetic unit includes comparing the current virtual address to a predetermined limit and delivering a fault signal to said data processing unit in response to the current virtual address exceeding said predetermined limit.

16. The method of controlling the conversion of virtual memory addresses to corresponding physical memory addresses as claimed in claim 12, wherein said data processing unit includes means for performing multi-precision operations upon data retrieved sequentially from memory in a predefined sequence, and wherein said method includes operating said arithmetic unit to sequentially produce the memory addresses in said sequence one at a time in response to receiving said hit signal.

* * * * *